United States Patent
Shimizu

(10) Patent No.: US 8,690,266 B2
(45) Date of Patent: Apr. 8, 2014

(54) VEHICLE BRAKING APPARATUS

(75) Inventor: Satoshi Shimizu, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 186 days.

(21) Appl. No.: 12/745,270

(22) PCT Filed: Feb. 13, 2009

(86) PCT No.: PCT/JP2009/052433
§ 371 (c)(1),
(2), (4) Date: May 28, 2010

(87) PCT Pub. No.: WO2009/104522
PCT Pub. Date: Aug. 27, 2009

(65) Prior Publication Data
US 2010/0308646 A1    Dec. 9, 2010

(30) Foreign Application Priority Data
Feb. 18, 2008    (JP) .................... 2008-036155

(51) Int. Cl.
*B60T 8/40*    (2006.01)

(52) U.S. Cl.
USPC ...................................... 303/116.1; 303/155

(58) Field of Classification Search
USPC .................. 303/11, 155, 113.1, 116.1, 116.2
See application file for complete search history.

(56) References Cited

U.S. PATENT DOCUMENTS 6,196,643 B1    3/2001    Yokoyama et al.
6,312,064 B1    11/2001    Koike et al.

FOREIGN PATENT DOCUMENTS

| JP | 10 305767 | 11/1998 |
| JP | 11 189139 | 7/1999 |
| JP | 2000 16259 | 1/2000 |

*Primary Examiner* — Bradley King
*Assistant Examiner* — Vu Q Nguyen
(74) *Attorney, Agent, or Firm* — Oblon, Spivak, McClelland, Maier & Neustadt, L.L.P.

(57) ABSTRACT

To configure brake fluid a pressure controlling unit to open a high pressure control valve to allow a high pressure generating unit that generates a brake fluid pressure higher than the brake fluid pressure according to brake pedal operation of a driver and a brake fluid pressure adjusting unit that adjust the brake fluid pressure to wheel cylinders to communicate with each other, when actual deceleration of a vehicle becomes lower than target deceleration by execution of anti-lock brake control during brake assist control.

6 Claims, 8 Drawing Sheets

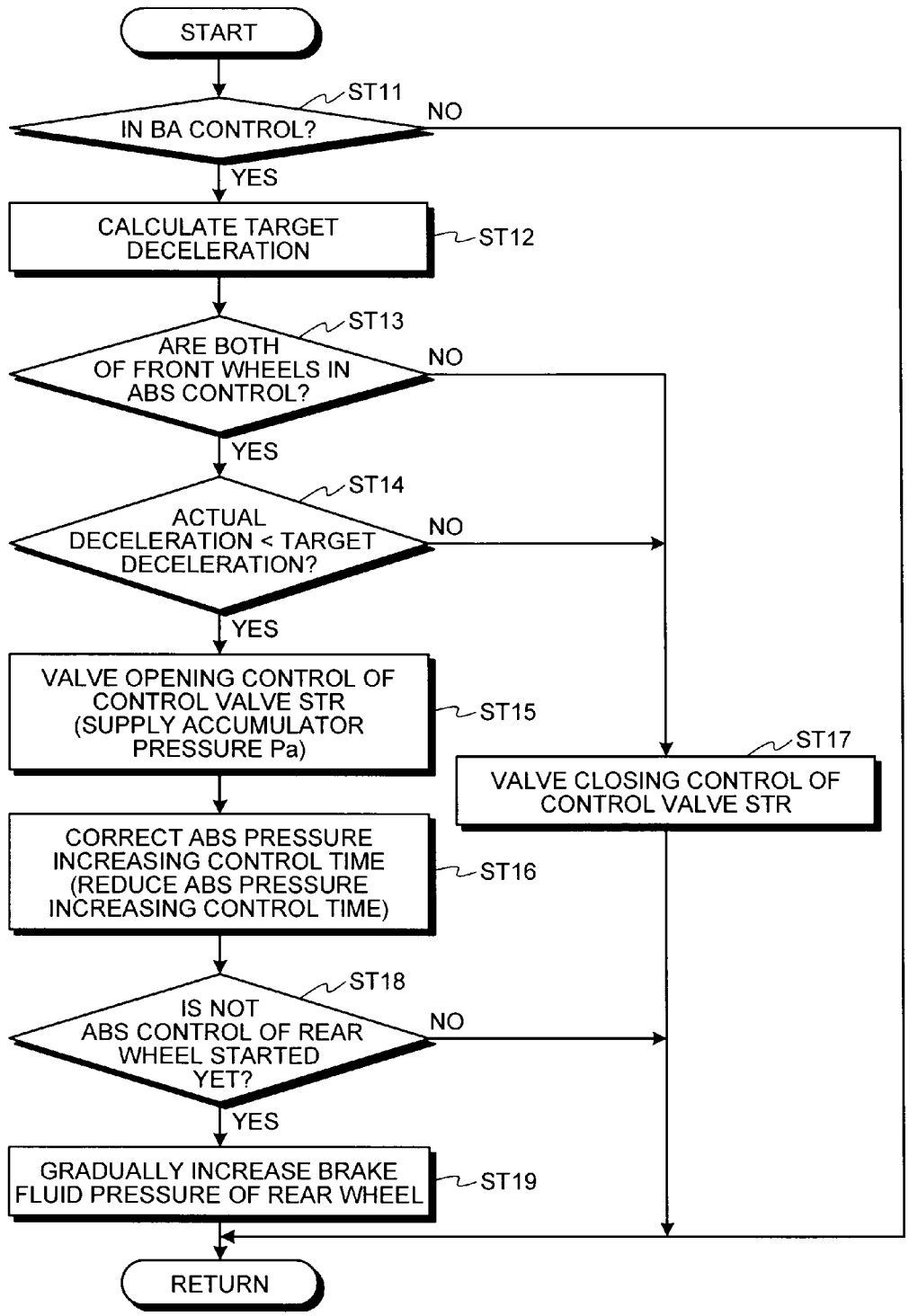

VEHICLE BRAKING APPARATUS

TECHNICAL FIELD

The present invention relates to a vehicle braking apparatus capable of simultaneously executing anti-lock brake control for adjusting a brake fluid pressure to each wheel and brake assist control for supplying the brake fluid pressure higher than a pressure of brake fluid (hereinafter, referred to as the "brake fluid pressure") according to brake pedal operation by a driver.

BACKGROUND ART

The vehicle braking apparatus capable of executing the brake assist control and the anti-lock brake control is conventionally known. For example, the vehicle braking apparatus is provided with brake fluid pressure generating means that generates the brake fluid pressure according to the brake pedal operation by the driver, high pressure generating means that generates the brake fluid pressure higher than the brake fluid pressure of the brake fluid pressure generating means and brake fluid pressure adjusting means that adjusts the brake fluid pressure to be supplied to a wheel cylinder of the wheel. The vehicle braking apparatus executes the brake assist control by supplying high brake fluid pressure of the high pressure generating means to the wheel cylinder. Also, the vehicle braking apparatus executes the anti-lock brake control by controlling the brake fluid pressure adjusting means to increase, reduce or hold the brake fluid pressure of the wheel cylinder.

Meanwhile, the following Patent Document 1 discloses that the anti-lock brake control is performed by increasing a pressure of the wheel cylinder by the high brake fluid pressure from a high pressure generating source during the brake assist control.

Patent Document 1: Japanese Patent Application Laid-open No. 2000-16259

DISCLOSURE OF INVENTION

Problem to be Solved by the Invention

However, when the anti-lock brake control is performed during the brake assist control by using the brake fluid pressure from the high pressure generating source as disclosed in the above-described Patent Document 1, a pressure increasing gradient of the brake fluid pressure of the wheel cylinder increases and hunting occurs when increasing and decreasing the pressure, so that controllability of the anti-lock brake control is lowered. Therefore, there is the conventional vehicle braking apparatus, for example, provided with a brake fluid pressure control valve that allows the brake fluid pressure generating means and the brake fluid pressure adjusting means to communicate with each other or blocks the communication, and a high pressure control valve that allows the high pressure generating means and the brake fluid pressure adjusting means to communicate with each other or blocks the communication, that blocks the brake fluid pressure control valve and the high pressure control valve at the time of the anti-lock brake control during the brake assist control.

According to the conventional vehicle braking apparatus, since pressure increasing control is not always continued by the high brake fluid pressure from the high pressure generating means at the time of the anti-lock brake control, lowering of the controllability of the anti-lock brake control by the hunting as disclosed in the Patent Document 1 is inhibited. On the other hand, in the conventional vehicle braking apparatus, the anti-lock brake control during the brake assist control is continued, so that an amount of the brake fluid returned to a reservoir tank becomes large and the brake fluid pressure between the brake fluid pressure control valve and the high pressure control valve, and the brake fluid pressure adjusting means of each wheel is reduced. Therefore, in the wheel, which is an anti-lock brake control target, it is possible that the brake fluid pressure of appropriate magnitude may not be supplied when the brake fluid pressure adjusting means performs the pressure increasing control. Also, in the wheel, which is not the anti-lock brake control target, it is possible that the brake fluid pressure of the appropriate magnitude required for the brake assist control may not be supplied due to reduction in the brake fluid pressure. Therefore, in a vehicle at that time, actual deceleration becomes smaller and this does not reach target deceleration, so that it is possible that the appropriate deceleration is not performed.

Therefore, the present invention is made to improve disadvantages of such conventional example, and an object of the present invention is to provide the vehicle braking apparatus capable of controlling the actual deceleration of the vehicle to the target deceleration even when the anti-lock brake control is executed during the brake assist control.

Means for Solving Problem

In order to achieve the object, according to one aspect of the present invention, a vehicle braking apparatus includes a brake fluid pressure generating unit that generates a brake fluid pressure according to brake pedal operation by a driver; a high pressure generating unit that generates brake fluid pressure higher than the brake fluid pressure of the brake fluid pressure generating unit; a brake fluid pressure adjusting unit that adjusts the brake fluid pressure to be supplied to a wheel cylinder of a wheel; a brake fluid pressure control valve that allows the brake fluid pressure generating unit and the brake fluid pressure adjusting unit to communicate with each other when being opened, and on the other hand blocks the communication when being closed; a high pressure control valve that allows the high pressure generating unit and the brake fluid pressure adjusting unit to communicate with each other when being opened, and on the other hand blocks the communication when being closed; and a brake fluid pressure controlling unit that closes the brake fluid pressure control valve at the time of brake assist control and opens the high pressure control valve until a downstream side of the high pressure control valve reaches a predetermined brake assist control pressure, and controls the brake fluid pressure adjusting unit of a wheel being an anti-lock brake control target at the time of anti-lock brake control to increase, reduce or hold the brake fluid pressure of the wheel cylinder of the wheel, wherein the brake fluid pressure controlling unit is configured to open the high pressure control valve when actual deceleration of a vehicle becomes lower than target deceleration by execution of the anti-lock brake control during the brake assist control.

Here, according to another aspect of the present invention, it is preferred that the brake fluid pressure controlling unit is configured to make anti-lock brake pressure increasing control time of the brake fluid pressure adjusting unit in the wheel being the anti-lock brake control target shorter, when performing opening control of the high pressure control valve when executing the anti-lock brake control during the brake assist control.

Further, according to still another aspect of the present invention, it is preferred that the brake fluid pressure controlling unit is configured to gradually increase the brake fluid pressure to be supplied to the wheel cylinder of the wheel by controlling the brake fluid pressure adjusting unit of the wheel being not the anti-lock brake control target, when performing opening control of the high pressure control valve when executing the anti-lock brake control during the brake assist control.

Effect of the Invention

The vehicle braking apparatus according to the present invention supplies the high brake fluid pressure of the high pressure generating means to an upstream part of the brake fluid pressure adjusting means, when the actual deceleration of the vehicle becomes lower than the target deceleration by execution of the anti-lock brake control during the brake assist control. Therefore, the brake fluid pressure of the appropriated magnitude according to the anti-lock brake control can be supplied to the wheel, which is the anti-lock brake control target, and the brake fluid pressure of the appropriate magnitude according to the brake assist control can be supplied to the wheel, which is not the anti-lock brake control target. Therefore, the vehicle braking apparatus can control the actual deceleration of the vehicle at that time to the target deceleration, thereby appropriately decelerating the vehicle.

BRIEF DESCRIPTION OF DRAWINGS

FIG. 8 is a flowchart illustrating another example of the operation at the time of the brake assist control of the vehicle braking apparatus according to the present invention.

Figure 1:
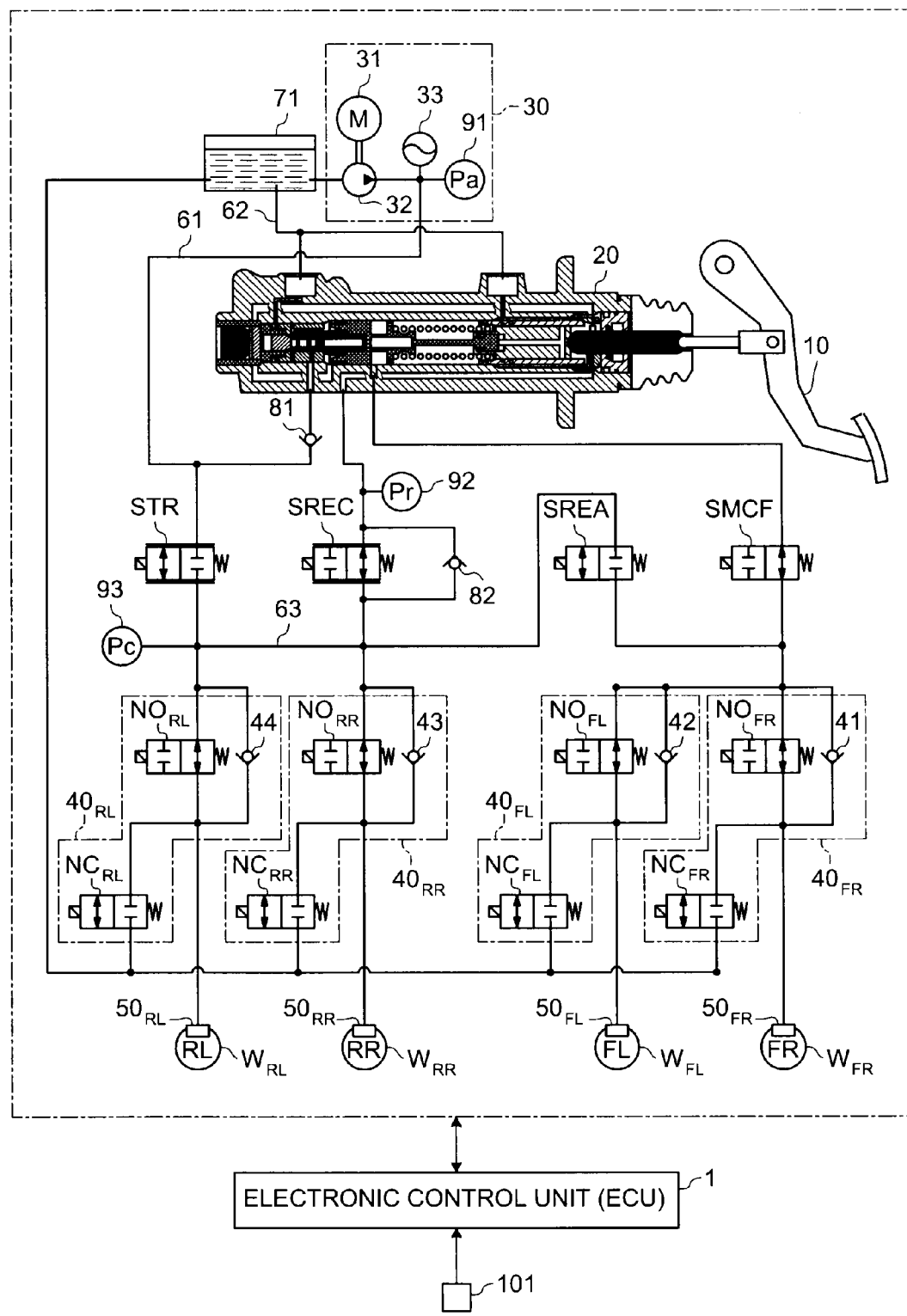
FIG. 1 is a view illustrating a configuration of a vehicle braking apparatus according to the present invention.

EXPLANATIONS OF LETTERS OR NUMERALS 1 electronic control unit (ECU)
10 brake pedal
20 brake fluid pressure generating means
30 high pressure generating means
31 motor
32 pump
33 accumulator
$40_{FR}$, $40_{FL}$, $40_{RR}$, $40_{RL}$ brake fluid pressure adjusting means
41, 42, 43, 44, 81, 82 check valve
$50_{FR}$, $50_{FL}$, $50_{RR}$, $50_{RL}$ wheel cylinder
91 accumulator pressure detecting sensor
92 regulator pressure detecting sensor
93 brake control pressure detecting sensor
$NC_{FR}$, $NC_{FL}$, $NC_{RR}$, $NC_{RL}$ pressure reducing valve
$NO_{FR}$, $NO_{FL}$, $NO_{RR}$, $NO_{RL}$ pressure increasing valve
SMCF control valve (pedal operational pressure control valve)
SREA control valve
SREC control valve (pedal operational pressure control valve)
STR control valve (high pressure control valve)
$W_{FR}$, $W_{FL}$, $W_{RR}$, $W_{RL}$ wheel

BEST MODE(S) FOR CARRYING OUT THE INVENTION

Hereinafter, an embodiment of a vehicle braking apparatus according to the present invention is described in detail with reference to the drawings. Meanwhile, the present invention is not limited by the embodiment.

Embodiment

The embodiment of the vehicle braking apparatus according to the present invention is described with reference to FIGS. 1 to 8.

First, a configuration of the vehicle braking apparatus of the embodiment is described with reference to FIG. 1.

The vehicle braking apparatus is provided with brake fluid pressure generating means 20 that generates a brake fluid pressure according to an operational amount of a brake pedal 10 by a driver, high pressure generating means 30 that generates the brake fluid pressure (accumulator pressure Pa) higher than the brake fluid pressure by the brake fluid pressure generating means 20 by pressurizing brake fluid, brake fluid pressure adjusting means $40_{FR}$, $40_{FL}$, $40_{RR}$ and $40_{RL}$ for wheels $W_{FR}$, $W_{FL}$, $W_{RR}$ and $W_{RL}$, respectively, capable of adjusting the brake fluid pressure generated by the brake fluid pressure generating means 20 and the high pressure generating means 30, and wheel cylinders $50_{FR}$, $50_{FL}$, $50_{RR}$ and $50_{RL}$ for the wheels $W_{FR}$, $W_{FL}$, $W_{RR}$ and $W_{RL}$, respectively, that generate braking force by the brake fluid pressure supplied through the brake fluid pressure adjusting means $40_{FR}$, $40_{FL}$, $40_{RR}$ and $40_{RL}$, respectively.

The brake fluid pressure generating means 20 is provided with a master cylinder that generates the brake fluid pressure (master cylinder pressure Pm) according to the operational amount of the brake pedal 10 by the driver and a hydrobooster that generates the brake fluid pressure (regulator pressure Pr) according to the operational amount. In the embodiment, as illustrated in FIG. 1, the brake fluid pressure generating means 20 in which the master cylinder and the hydrobooster are integrated with each other is illustrated as an example.

A hydrobooster unit of the brake fluid pressure generating means 20 is connected to an accumulator 33 to be described later of the high pressure generating means 30 through brake fluid piping 61 illustrated in FIG. 1, and this assists the operational amount (operational force) of the brake pedal 10 at a predetermined rate by utilizing the accumulator pressure Pa supplied from the accumulator 33 through the brake fluid piping 61 and transmits the assisted operational amount to the master cylinder unit. Then, the master cylinder unit generates the master cylinder pressure Pm according to the transmitted operational amount. Also, the hydrobooster unit generates the regulator pressure Pr substantially as large as the master cylinder pressure Pm by input of the master cylinder pressure Pm.

Also, the high pressure generating means 30 is provided with a motor 31, a pump 32 driven by the motor 31 to suck the brake fluid in a reservoir tank 71 and pressurizes the same to discharge, and the accumulator 33 that accumulates the brake fluid pressurized by the pump 32, as illustrated in FIG. 1.

The motor 31 is drive-controlled by the high pressure controlling means of an electronic control unit (ECU) 1 illustrated in FIG. 1. The high pressure controlling means is configured to drive the motor 31 when the pressure in the accumulator 33 (accumulator pressure Pa) becomes lower than a predetermined lower limit and to stop the motor 31 when the accumulator pressure Pa becomes higher than a predetermined upper limit. That is to say, the accumulator pressure Pa is adjusted between the lower limit and the upper limit.

Herein, a check valve 81 that allows the brake fluid to flow from a side of the accumulator 33 to a side of the hydrobooster unit at a pressure not lower than a predetermined pressure and blocks the flow of the brake fluid from the side of the hydrobooster unit to the side of the accumulator 33 is arranged on the brake fluid piping 61 that connects the accumulator 33 and the above-described hydrobooster unit of the brake fluid pressure generating means 20, as illustrated in FIG. 1. The predetermined pressure is set so as to be higher than the upper limit of the above-described accumulator pressure Pa. Therefore, the accumulator pressure Pa, which becomes excessively high, is not transmitted to each of the wheel cylinders $50_{FR}$, $50_{FL}$, $50_{RR}$ and $50_{RL}$, and further a fluid pressure circuit of the high pressure generating means 30 is protected. Meanwhile, the brake fluid, which passes through the check valve 81, is returned to the reservoir tank 71 through the hydrobooster unit and brake fluid piping 62 illustrated in FIG. 1. Also, a pressure sensor (hereinafter, "accumulator pressure detecting sensor") 91 illustrated in FIG. 1 that detects magnitude of the accumulator pressure Pa is arranged on the brake fluid piping 61.

Next, the brake fluid pressure adjusting means $40_{FR}$, $40_{FL}$, $40_{RR}$ and $40_{RL}$ are described in detail. The brake fluid pressure adjusting means $40_{FR}$, $40_{FL}$, $40_{RR}$ and $40_{RL}$ adjust the brake fluid pressure generated by the brake fluid pressure generating means 20 and the high pressure generating means 30 as described above, and execute ABS control to be described later by adjusting the brake fluid pressure to be supplied to the wheel cylinders $50_{FR}$, $50_{FL}$, $50_{RR}$ and $50_{RL}$ of the wheels $W_{FR}$, $W_{FL}$, $W_{RR}$ and $W_{RL}$, respectively.

The brake fluid pressure adjusting means $40_{FR}$ of the right front wheel $W_{FR}$ is provided with a pressure increasing valve $NO_{FR}$, which is normally opened and is closed according to a control command of brake fluid pressure controlling means of the electronic control unit 1, and a pressure reducing valve $NC_{FR}$, which is normally closed and is opened according to the control command of the brake fluid pressure controlling means. In the embodiment, a two-port two-position switching normally opened electromagnetic valve (linear valve) is used as the pressure increasing valve $NO_{FR}$, and a two-port two-position switching normally closed electromagnetic valve (linear valve) is used as the pressure reducing valve $NC_{FR}$. The pressure increasing valve $NO_{FR}$ allows an upstream part of the brake fluid pressure adjusting means $40_{FR}$ and the wheel cylinder $50_{FR}$ to communicate with each other in a nonexcited state illustrated in FIG. 1, and on the other hand, this blocks the communication between the upstream part of the brake fluid pressure adjusting means $40_{FR}$ and the wheel cylinder $50_{FR}$ in an excited state. Also, the pressure reducing valve $NC_{FR}$ blocks communication between the wheel cylinder $50_{FR}$ and the reservoir tank 71 in the nonexcited state, and on the other hand, this allows the wheel cylinder $50_{FR}$ and the reservoir tank 71 to communicate with each other in the excited state. Meanwhile, the term "upstream" is herein intended to mean a side of the brake fluid pressure generating means 20 and a side of the high pressure generating means 30. Therefore, a term "downstream" in this case is intended to mean sides of the wheel cylinders $50_{FR}$, $50_{FL}$, $50_{RR}$ and $50_{RL}$.

The brake fluid pressure adjusting means $40_{FR}$ supplies the brake fluid of the upstream part of the brake fluid pressure adjusting means $40_{FR}$ to the wheel cylinder $50_{FR}$ when both of the pressure increasing valve $NO_{FR}$ and the pressure reducing valve $NC_{FR}$ are in the nonexcited state. According to this, the brake fluid pressure adjusting means $40_{FR}$ increases the brake fluid pressure in the wheel cylinder $50_{FR}$ of the right front wheel $W_{FR}$ (ABS pressure increasing control). Also, the brake fluid pressure adjusting means $40_{FR}$ holds magnitude of the brake fluid pressure in the wheel cylinder $50_{FR}$ at that time when the pressure increasing valve $NO_{FR}$ is put into the excited state and the pressure reducing valve $NC_{FR}$ is put into the nonexcited state (ABS holding control). Also, the brake fluid pressure adjusting means $40_{FR}$ returns the brake fluid in the wheel cylinder $50_{FR}$ to the reservoir tank 71 when both of the pressure increasing valve $NO_{FR}$ and the pressure reducing valve $NC_{FR}$ are in the excited state. According to this, the brake fluid pressure adjusting means $40_{FR}$ reduces the brake fluid pressure in the wheel cylinder $50_{FR}$ of the right front wheel $W_{FR}$ (ABS pressure reducing control).

Further, as illustrated in FIG. 1, a check valve 41 that allows the brake fluid to flow from the side of the wheel cylinder $50_{FR}$ to upstream of the brake fluid pressure adjusting means $40_{FR}$, and on the other hand blocks the flow of the brake fluid from upstream of the brake fluid pressure adjusting means $40_{FR}$ to the side of the wheel cylinder $50_{FR}$ is arranged in the brake fluid pressure adjusting means $40_{FR}$ so as to be parallel to the pressure increasing valve $NO_{FR}$. The check valve 41 is arranged for rapidly reducing the brake fluid pressure in the wheel cylinder $50_{FR}$ when a control valve SMCF to be described later is opened and the operational amount of the brake pedal 10 is reduced such as when the driver lifts his/her foot therefrom.

The brake fluid pressure adjusting means $40_{FL}$, $40_{RR}$ and $40_{RL}$ of the remaining wheels $W_{FL}$, $W_{RR}$ and $W_{RL}$, respectively, have the configuration similar to that of the above-described brake fluid pressure adjusting means $40_{FR}$ of the right front wheel $W_{FR}$ as illustrated in FIG. 1. That is to say, the brake fluid pressure adjusting means $40_{FL}$ of the left front wheel $W_{FL}$ is provided with a pressure increasing valve $NO_{FL}$, a pressure reducing valve $NC_{FL}$ and a check valve 42, and this realizes the ABS pressure increasing control, the ABS holding control and the ABS pressure reducing control of the brake fluid pressure of the wheel cylinder $50_{FL}$ of the left front wheel $W_{FL}$, and further, rapid reduction in the brake fluid pressure. Also, the brake fluid pressure adjusting means $40_{RR}$ of the right rear wheel $W_{RR}$ is provided with a pressure increasing valve $NO_{RR}$, a pressure reducing valve $NC_{RR}$ and a check valve 43, and this realizes the ABS pressure increasing control, the ABS holding control and the ABS pressure reducing control of the brake fluid pressure in the wheel cylinder $50_{RR}$ of the right rear wheel $W_{RR}$, and further, rapid reduction in the brake fluid pressure. Also, the brake fluid pressure adjusting means $40_{RL}$ of the left rear wheel $W_{RL}$ is provided with a pressure increasing valve $NO_{RL}$, a pressure reducing valve $NC_{RL}$ and a check valve 44, and this realizes the ABS pressure increasing control, the ABS holding control and the ABS pressure reducing control of the brake fluid pressure in the wheel cylinder $50_{RL}$ of the left rear wheel $W_{RL}$, and further, rapid reduction in the brake fluid pressure.

In the vehicle braking apparatus of the embodiment, the control valve SMCF, which is normally opened and is closed according to the control command of the brake fluid pressure controlling means of the electronic control unit 1, is arranged between the above-described master cylinder unit of the brake fluid pressure generating means 20 and the upstream parts of the brake fluid pressure adjusting means $40_{FR}$ and $40_{FL}$ of the front wheels $W_{FR}$ and $W_{FL}$, respectively. In the embodiment, the two-port two-position switching normally opened electromagnetic valve is used as the control valve SMCF. The control valve SMCF is opened in the nonexcited state illustrated in FIG. 1 to allow the master cylinder unit and the upstream parts of the brake fluid pressure adjusting means $40_{FR}$ and $40_{FL}$ of the front wheels $W_{FR}$ and $W_{FL}$, respectively, to communicate with each other, and on the other hand, this is closed in the excited state illustrated in FIG. 3, for example, to block the communication between the master cylinder unit and the upstream parts of the brake fluid pressure adjusting means $40_{FR}$ and $40_{FL}$ of the front wheels $W_{FR}$ and $W_{FL}$, respectively. Therefore, the master cylinder pressure Pm is supplied from the master cylinder unit of the brake fluid pressure generating means 20 to an upstream part of the control valve SMCF. That is to say, the control valve SMCF serves as a brake fluid pressure control valve that executes or stops the supply of the master cylinder pressure Pm to the upstream parts of the brake fluid pressure adjusting means $40_{FR}$ and $40_{FL}$.

Also, in the vehicle braking apparatus, a control valve SREC, which is normally opened and is closed according to the control command of the brake fluid pressure controlling means of the electronic control unit 1, is arranged between the above-described hydrobooster unit of the brake fluid pressure generating means 20 and an upstream parts of the brake fluid pressure adjusting means $40_{RR}$ and $40_{RL}$ of the rear wheels $W_{RR}$ and $W_{RL}$, respectively. In the embodiment, the two-port two-position switching normally opened electromagnetic valve (linear valve) is used as the control valve SREC. The control valve SREC is opened in the nonexcited state illustrated in FIG. 1 to allow the hydrobooster unit and the upstream parts of the brake fluid pressure adjusting means $40_{RR}$ and $40_{RL}$ of the rear wheels $W_{RR}$ and $W_{RL}$, respectively, to communicate with each other, and on the other hand, this is closed in the excited state illustrated in FIG. 4, for example, to block the communication between the hydrobooster unit and the upstream parts of the brake fluid pressure adjusting means $40_{RR}$ and $40_{RL}$ of the rear wheels $W_{RR}$ and $W_{RL}$, respectively. Therefore, the regulator pressure Pr is supplied from the hydrobooster unit of the brake fluid pressure generating means 20 to an upstream part of the control valve SREC. That is to say, the control valve SREC serves as the brake fluid pressure control valve that executes or stops the supply of the regulator pressure Pr to the upstream parts of the brake fluid pressure adjusting means $40_{RR}$ and $40_{RL}$. In the vehicle braking apparatus of the embodiment, a pressure sensor (hereinafter, referred to as a "regulator pressure detecting sensor") 92 illustrated in FIG. 1 that detects magnitude of the regulator pressure Pr is arranged in the upstream part of the control valve SREC.

Herein, a check valve 82 is arranged in the vehicle braking apparatus so as to be parallel to the control valve SREC. The check valve 82 allows the brake fluid to flow from upstream to downstream of the control valve SREC, and on the other hand, this blocks the flow of the brake fluid from downstream to upstream thereof. The check valve 82 can increase the brake fluid pressure in the wheel cylinders $50_{RR}$ and $50_{RL}$ of the rear wheels $W_{RR}$ and $W_{RL}$, respectively, by operating when the control valve SREC is in the excited state (closed state) and the driver increases the operational amount of the brake pedal 10. At that time, when a control valve SREA illustrated in FIG. 1 to be described later is opened, the check valve 82 can also increase the brake fluid pressure in the wheel cylinders $50_{FR}$ and $50_{FL}$ of the front wheels $W_{FR}$ and $W_{FL}$, respectively, by the increase of the operational amount of the brake pedal 10.

Further, brake fluid piping 63 that connects a downstream part of the above-described control valve SMCF (in other words, the upstream parts of the brake fluid pressure adjusting means $40_{FR}$ and $40_{FL}$ of the front wheels $W_{FR}$ and $W_{FL}$, respectively), a downstream part of the control valve SREC (in other words, the upstream parts of the brake fluid pressure adjusting means $40_{RR}$ and $40_{RL}$ of the rear wheels $W_{RR}$ and $W_{RL}$, respectively), and a downstream part of a control valve STR to be described later (in other words, the upstream parts of the brake fluid pressure adjusting means $40_{RR}$ and $40_{RL}$ of the rear wheels $W_{RR}$ and $W_{RL}$, respectively) is arranged in the vehicle braking apparatus. Then, the control valve SREA, which is normally closed and is opened according to the control command of the brake fluid pressure controlling means of the electronic control unit 1, is arranged between the downstream parts of the control valve SMCF and the control valve SREC on the brake fluid piping 63. In the embodiment, the two-port two-position switching normally closed electromagnetic valve is used as the control valve SREA. The control valve SREA is closed in the nonexcited state illustrated in FIG. 1 to block communication between the downstream part of the control valve SMCF (upstream parts of the brake fluid pressure adjusting means $40_{FR}$ and $40_{FL}$ of the front wheels $W_{FR}$ and $W_{FL}$, respectively) and the downstream part of the control valve SREC (upstream parts of the brake fluid pressure adjusting means $40_{RR}$ and $40_{RL}$ of the rear wheel $W_{RR}$ and $W_{RL}$, respectively), and on the other hand, this is opened in the excited state illustrated in FIG. 3, for example, to allow them to communicate with each other. Meanwhile, the downstream part of the control valve SREC and the downstream part of the control valve STR are always in communication with each other through the brake fluid piping 63.

Also, the vehicle braking apparatus is provided with the control valve STR, which is normally closed and is opened according to the control command of the brake fluid pressure controlling means of the electronic control unit 1, between the above-described high pressure generating means 30 (specifically, the brake fluid piping 61) and the brake fluid piping 63. In the embodiment, the two-port two-position switching normally closed electromagnetic valve (linear valve) is used as the control valve STR. The control valve STR is closed in the nonexcited state illustrated in FIG. 1 to block communication between the high pressure generating means 30 and the brake fluid piping 63, and on the other hand, this is opened in the excited state illustrated in FIG. 6, for example, to allow the high pressure generating means 30 and the brake fluid piping 63 to communicate with each other. Therefore, the accumulator pressure Pa is supplied from the high pressure generating means 30 to the upstream part of the control valve STR, and the control valve STR serves as a high pressure control valve for supplying a brake assist control pressure $Pc_{BA}$ at the time of brake assist control to be described later to the wheel cylinders $50_{FR}$, $50_{FL}$, $50_{RR}$ and $50_{RL}$ of the wheels $W_{FR}$, $W_{FL}$, $W_{RR}$ and $W_{RL}$, respectively. In the vehicle braking apparatus of the embodiment, a pressure sensor (hereinafter, referred to as a "brake control pressure detecting sensor") 93 illustrated in FIG. 1 that detects magnitude of a brake fluid pressure Pc (hereinafter, referred to as a "brake control pressure") of the brake fluid piping 63 is arranged.

Figure 2:
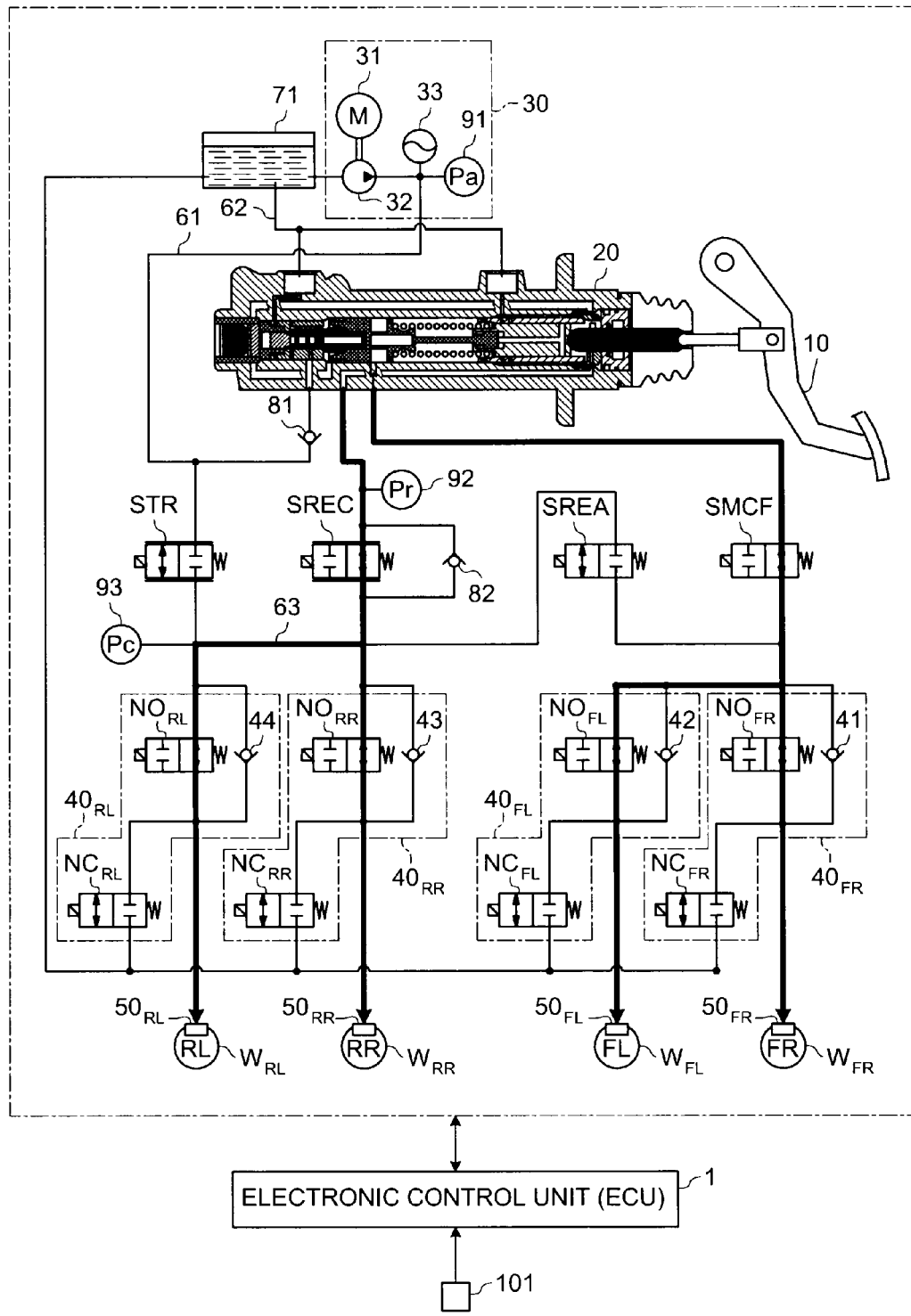
FIG. 2 is a view illustrating an acting state of a brake fluid pressure at the time of normal brake control of the vehicle braking apparatus according to the present invention.

In the vehicle braking apparatus of the embodiment configured as described above, the brake fluid pressure controlling means controls all of the control valves SMCF, SREA, SREC and STR in the nonexcited state when performing normal brake control illustrated in FIG. 2. Also, at that time, the brake fluid pressure controlling means controls all of the pressure increasing valves $NO_{FR}$, $NO_{FL}$, $NO_{RR}$ and $NO_{RL}$ and the pressure reducing valves $NC_{FR}$, $NC_{FL}$, $NC_{RR}$ and $NC_{RL}$ of the brake fluid pressure adjusting means $40_{FR}$, $40_{FL}$, $40_{RR}$ and $40_{RL}$ of the wheels $W_{FR}$, $W_{FL}$, $W_{RR}$ and $W_{RL}$, respectively, in the nonexcited state.

According to this, the control valve SMCF is opened and the control valve SREA is closed, so that the master cylinder pressure Pm is supplied to each of the upstream parts of the brake fluid pressure adjusting means $40_{FR}$ and $40_{FL}$ of the front wheels $W_{FR}$ and $W_{FL}$, respectively. Then, since the brake fluid pressure adjusting means $40_{FR}$ and $40_{FL}$ of the front wheels $W_{FR}$ and $W_{FL}$ at that time are in the above-described ABS pressure increasing control state, the master cylinder pressure Pm is supplied to each of the wheel cylinders $50_{FR}$ and $50_{FL}$ of the front wheels $W_{FR}$ and $W_{FL}$, respectively. On the other hand, since the control valve SREC is opened and the control valve STR is closed at that time, the regulator pressure Pr is supplied to each of the upstream parts of the brake fluid pressure adjusting means $40_{RR}$ and $40_{RL}$ of the rear wheels $W_{RR}$ and $W_{RL}$, respectively. Then, since the brake fluid pressure adjusting means $40_{RR}$ and $40_{RL}$ of the rear wheels $W_{RR}$ and $W_{RL}$ at that time are in the ABS pressure increasing control state, the regulator pressure Pr is supplied to each of the wheel cylinders $50_{RR}$ and $50_{RL}$ of the rear wheels $W_{RR}$ and $W_{RL}$, respectively. That is to say, the master cylinder pressure Pm and the regulator pressure Pr according to the operational amount of the brake pedal 10 by the driver are supplied to the front wheels $W_{FR}$ and $W_{FL}$, and the rear wheels $W_{RR}$ and $W_{RL}$, respectively, at the time of the normal brake control, and the braking force according to the master cylinder pressure Pm and the regulator pressure Pr act on the front wheels $W_{FR}$ and $W_{FL}$ and the rear wheels $W_{RR}$ and $W_{RL}$. Meanwhile, the brake control pressure detecting sensor 93 at the time of the normal brake control detects the regulator pressure Pr as the brake control pressure Pc.

Figure 3:
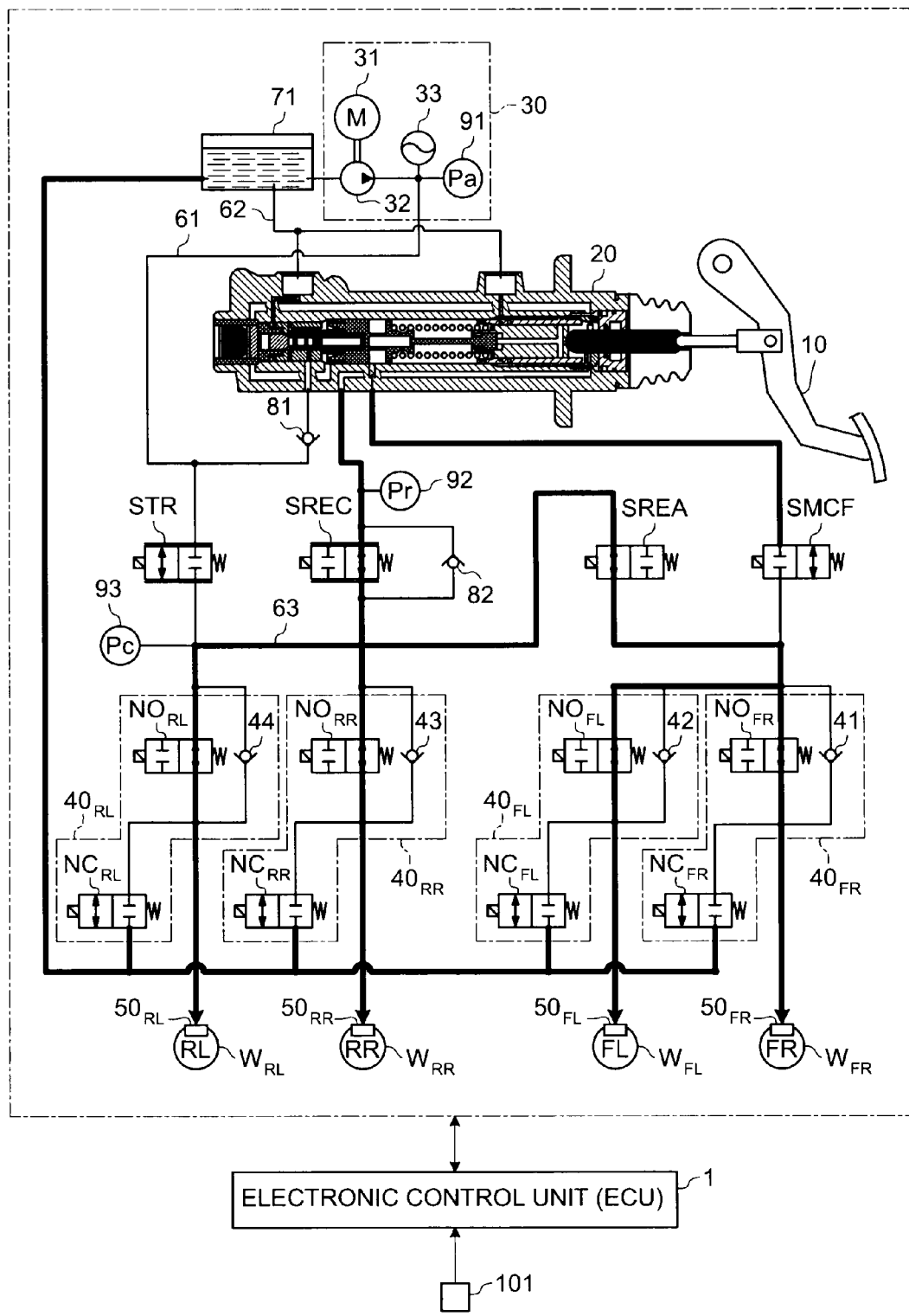
FIG. 3 is a view illustrating an example of the acting state of the brake fluid pressure at the time of ABS control of the vehicle braking apparatus according to the present invention.

Also, when performing anti-lock brake control (ABS control), the brake fluid pressure controlling means controls the control valves SMCF and SREA in the excited state and controls the control valves SREC and STR in the nonexcited state, as illustrated in FIG. 3. At that time, the brake fluid pressure controlling means allows the brake fluid pressure adjusting means $40_{FR}$ or $40_{FL}$ or $40_{RR}$ or $40_{RL}$, which is an ABS control target, to switch the ABS pressure increasing control, the ABS pressure reducing control and the ABS holding control according to a slip ratio and the like of the wheels $W_{FR}$, $W_{FL}$, $W_{RR}$ and $W_{RL}$.

According to this, the control valve SMCF is closed, so that the supply of the master cylinder pressure Pm from the master cylinder unit of the brake fluid pressure generating means 20 to the upstream parts of the brake fluid pressure adjusting means $40_{FR}$ and $40_{FL}$ of the front wheels $W_{FR}$ and $W_{FL}$, respectively, is blocked. On the other hand, the control valve SREC is opened and the control valve STR is closed as at the time of the normal brake control, so that the regulator pressure Pr is supplied to each of the upstream parts of the brake fluid pressure adjusting means $40_{RR}$ and $40_{RL}$ of the rear wheels $W_{RR}$ and $W_{RL}$, respectively. Since the control valve SREA is opened at that time, the regulator pressure Pr is supplied to each of the upstream parts of the brake fluid pressure adjusting means $40_{FR}$ and $40_{FL}$ of the front wheels $W_{FR}$ and $W_{FL}$, respectively. Therefore, the brake fluid pressure obtained by adjusting the regulator pressure Pr by the brake fluid pressure adjusting means $40_{FR}$, $40_{FL}$, $40_{RR}$ and $40_{RL}$ according to the slip ratio and the like is supplied to the wheel cylinders $50_{FR}$, $50_{FL}$, $50_{RR}$ and $50_{RL}$ of the wheels $W_{FR}$, $W_{FL}$, $W_{RR}$ and $W_{RL}$, respectively. Meanwhile, the brake control pressure detecting sensor 93 at the time of the ABS control detects the regulator pressure Pr as the brake control pressure Pc.

Figure 4:
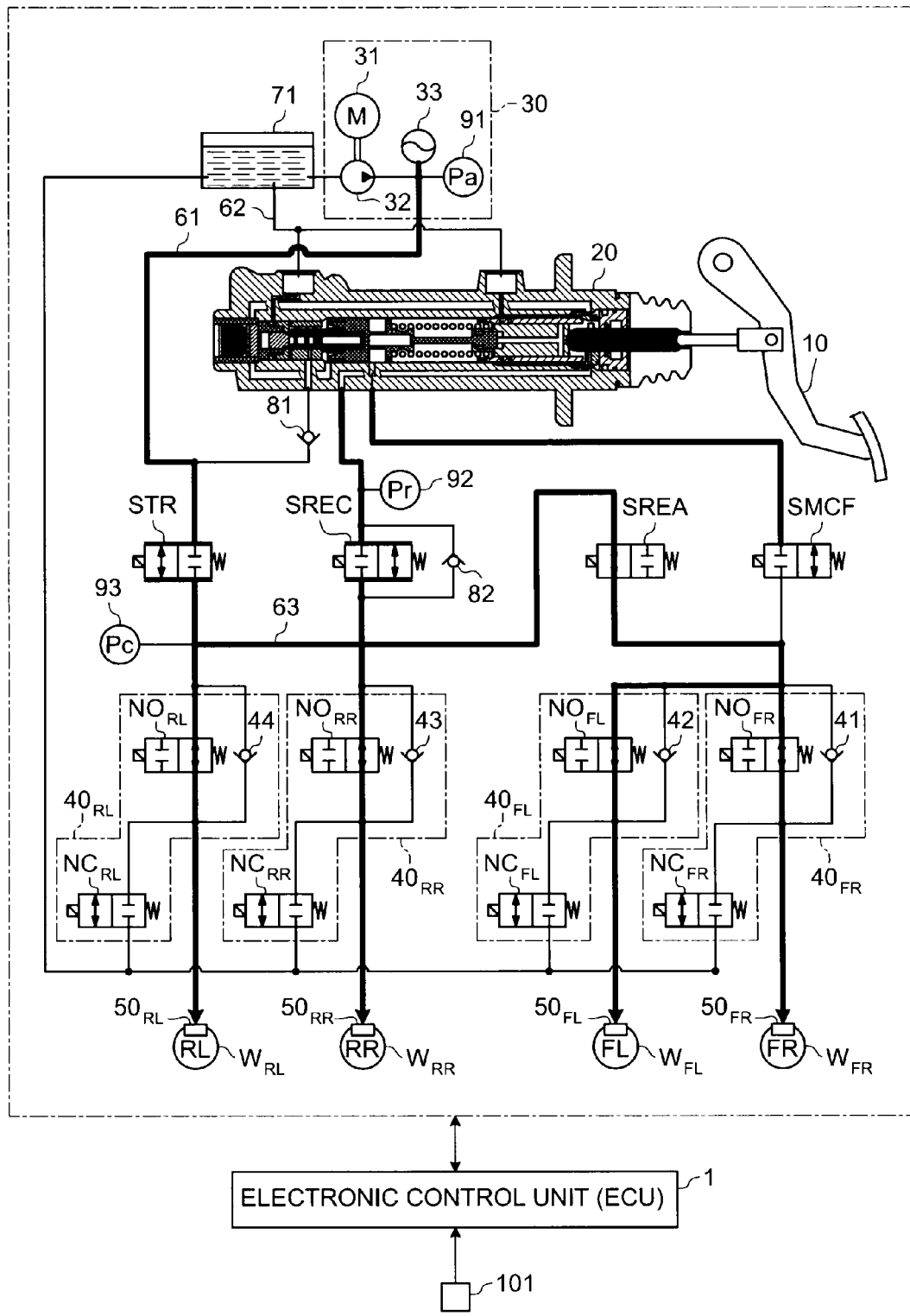
FIG. 4 is a view illustrating the acting state of the brake fluid pressure at the time of brake assist control of the vehicle braking apparatus according to the present invention.

Also, when performing the brake assist control (BA control), the brake fluid pressure controlling means is allowed to control the control valves SMCF, SREA, SREC, STR and the like to increase the brake control pressure Pc of the brake fluid piping 63 to be "regulator pressure Pr+additional amount of the brake fluid pressure required for the brake assist control" and to supply the brake control pressure (hereinafter, referred to as the "brake assist control pressure") $Pc_{BA}$ required for the brake assist control to the wheel cylinders $50_{FR}$, $50_{FL}$, $50_{RR}$ and $50_{RL}$ of the wheels $W_{FR}$, $W_{FL}$, $W_{RR}$ and $W_{RL}$, respectively. Specifically, the brake fluid pressure controlling means at that time controls the control valves SMCF and SREA in the excited state as illustrated in FIG. 4 and further switches the control valves STR and SREC between the nonexcited state and the excited state according to the brake assist control pressure $Pc_{BA}$. Further, at that time, the brake fluid pressure controlling means controls the pressure increasing valves $NO_{FR}$, $NO_{FL}$, $NO_{RR}$ and $NO_{RL}$ and the pressure reducing valves $NC_{FR}$, $NC_{FL}$, $NC_{RR}$ and $NC_{RL}$ of the brake fluid pressure adjusting means $40_{FR}$, $40_{FL}$, $40_{RR}$ and $40_{RL}$ of the wheels $W_{FR}$, $W_{FL}$, $W_{RR}$ and $W_{RL}$, respectively, in the nonexcited state. That is to say, in the vehicle braking apparatus, the brake assist control pressure $Pc_{BA}$ is adjusted by switching opening and closing of the control valves STR and SREC as the brake assist pressure control valves, thereby executing the brake assist control. Meanwhile, the brake assist control pressure $Pc_{BA}$ and the additional amount of the brake fluid pressure required for the brake assist control are determined according to the operational amount (pedal force and the like) of the brake pedal 10 by the driver, the regulator pressure Pr, a vehicle speed and the like, for example.

For example, when performing the brake assist control, the brake fluid pressure controlling means observes pressure difference between detected values of the regulator pressure detecting sensor 92 and the brake control pressure detecting sensor 93 and switches the control valves STR and SREC between the excited state (opened state) and the nonexcited state (closed state) such that the pressure difference becomes the accumulator pressure Pa. According to this, the accumulator pressure Pa of the high pressure generating means 30 is supplied to the brake fluid piping 63 with the regulator pressure Pr, so that the brake assist control pressure $Pc_{BA}$ (=regulator pressure Pr+accumulator pressure Pa) is supplied to the wheel cylinders $50_{FR}$, $50_{FL}$, $50_{RR}$ and $50_{RL}$ of the wheels $W_{FR}$, $W_{FL}$, $W_{RR}$ and $W_{RL}$, respectively. After the brake assist control pressure $Pc_{BA}$ is detected by the brake control pressure detecting sensor 93, the brake fluid pressure controlling means controls the control valve STR into the nonexcited state (closed state) illustrated in FIG. 4 to hold the brake fluid pressure of each of the wheel cylinders $50_{FR}$, $50_{FL}$, $50_{RR}$ and $50_{RL}$ at the brake control pressure Pc required for the brake assist control.

Herein, there is a case in which the ABS control is executed during execution of the brake assist control. In this case, the brake fluid pressure controlling means switches the control valves SREC and STR between the nonexcited state and the excited state same as when performing the brake assist control alone, thereby generating the brake assist control pressure $Pc_{PA}$ in the brake fluid piping 63. Also, the brake fluid pressure controlling means at that time switches the pressure increasing valve $NO_{FR}$ or $NO_{FL}$ or $NO_{RR}$ or $NO_{RL}$ and the pressure reducing valve $NC_{FR}$ or $NC_{FL}$ or $NC_{RR}$ or $NC_{RL}$ of the brake fluid pressure adjusting means $40_{FR}$ or $40_{FL}$ or $40_{RR}$ or $40_{RL}$, which is the ABS control target, among the ABS pressure increasing control state, the ABS pressure reducing control state and the ABS holding control state, same as when performing the ABS control alone, thereby preventing the wheel $W_{FR}$ or $W_{FL}$ or $W_{RR}$ or $W_{RL}$, which is the ABS control target, from being locked.

When the control valves SMCF, SREC and STR are closed and the control valve SREA is opened in association with the execution of the brake assist control alone as illustrated in FIG. 4, the brake fluid between the downstream parts of the control valves SMCF, SREC and STR and the wheel cylinders $50_{FR}$, $50_{FL}$, $50_{RR}$ and $50_{RL}$ holds the high brake assist control pressure $Pc_{BA}$ and has nowhere to go. Therefore, between them, only slight change in brake fluid amount largely changes the brake fluid pressure.

When the ABS control is started under such a circumstance, the brake fluid pressure adjusting means $40_{FR}$ or $40_{FL}$ or $40_{RR}$ or $40_{RL}$, which is the ABS control target, is allowed to perform the ABS pressure reducing control, so that the pressure increasing valve $NO_{FR}$ or $NO_{FL}$ or $NO_{RR}$ or $NO_{RL}$, which is the ABS control target, is closed, and at the same time, the pressure reducing valve $NC_{FR}$ or $NC_{FL}$ or $NC_{RR}$ or $NC_{RL}$ is opened, and a part of the brake fluid between a downstream part of the pressure increasing valve $NO_{FR}$ or $NO_{FL}$ or $NO_{RR}$ or $NO_{RL}$, which is the ABS control targets, and the wheel cylinder $50_{FR}$ or $50_{FL}$ or $50_{RR}$ or $50_{RL}$, which is the ABS control target, is returned to the reservoir tank 71. Therefore, the brake fluid pressure is reduced between the downstream part of the pressure increasing valve $NO_{FR}$ or $NO_{FL}$ or $NO_{RR}$ or $NO_{RL}$, which is the ABS control target, and the wheel cylinder $50_{FR}$ or $50_{FL}$ or $50_{RR}$ and $50_{RL}$, which is the ABS control target.

Then, in the ABS control after that, when the brake fluid pressure adjusting means $40_{FR}$ or $40_{FL}$ or $40_{RR}$ or $40_{RL}$, which is the ABS control target, is allowed to perform the ABS pressure increasing control, the pressure increasing valve $NO_{FR}$ or $NO_{FL}$ or $NO_{RR}$ or $NO_{RL}$, which is the ABS control target, is opened, and at the same time the pressure reducing valve $NC_{FR}$ or $NC_{FL}$ or $NC_{RR}$ or $NC_{RL}$ is closed. At that time, a part of the brake fluid between the upstream parts of the pressure increasing valves $NO_{FR}$, $NO_{FL}$, $NO_{RR}$ and $NO_{RL}$ and the control valves SMCF, SREC and STR flows between the downstream part of the pressure increasing valve $NO_{FR}$ or $NO_{FL}$ or $NO_{RR}$ or $NO_{RL}$, which is the ABS control target, and the wheel cylinder $50_{FR}$ or $50_{FL}$ or $50_{RR}$ or $50_{RL}$, which is the ABS control target. Therefore, the brake control pressure Pc (<brake assist control pressure $Pc_{BA}$) is reduced between the upstream parts of the pressure increasing valves $NO_{FR}$, $NO_{FL}$, $NO_{RR}$ and $NO_{RL}$ and the control valves SMCF, SREC and STR (that is to say, in the brake fluid piping 63).

When the ABS control is executed during the brake assist control in this manner, the brake control pressure Pc of the brake fluid piping 63 is largely reduced while the brake fluid pressure adjusting means $40_{FR}$ or $40_{FL}$, or $40_{RR}$ or $40_{RL}$, which is the ABS control target, alternately repeats the ABS pressure increasing control, the ABS pressure reducing control and the ABS holding control. Therefore, at that time, since the brake control pressure Pc of the brake fluid piping 63 is deficient, it is possible that the brake fluid pressure of the appropriate magnitude required for the ABS pressure increasing control may not be supplied to the wheel cylinder $50_{FR}$ or $50_{FL}$ or $50_{RR}$ or $50_{RL}$, which is the ABS control target, even when the brake fluid pressure adjusting means $40_{FR}$ or $40_{FL}$ or $40_{RR}$ or $40_{RL}$, which is the ABS control target, is switched from the ABS pressure reducing control and the ABS holding control to the ABS pressure increasing control. According to this, in a vehicle, actual deceleration (hereinafter, referred to as "actual deceleration") becomes smaller and this does not reach target deceleration, so that it is possible that appropriate deceleration is not performed. Further, since the brake fluid pressure adjusting means $40_{FR}$ or $40_{FL}$ or $40_{RR}$ or $40_{RL}$, which is not the ABS control target, is in the ABS pressure increasing control state (that is to say, the pressure increasing valve $NO_{FR}$ or $NO_{FL}$ or $NO_{RR}$ or $NO_{RL}$ thereof is opened), it is possible that the brake fluid pressure of the appropriate magnitude required for the brake assist control may not be supplied in association with deficiency of the brake control pressure Pc in the brake fluid piping 63 also to the wheel cylinder $50_{FR}$ or $50_{FL}$ or $50_{RR}$ or $50_{RL}$, which is not the ABS control target, at that time. Therefore, in the vehicle at that time, the actual deceleration becomes further smaller and this does not reach the target deceleration, so that it is highly possible that the appropriate deceleration is not performed.

Then, the vehicle braking apparatus of the embodiment is configured to be able to control the actual deceleration of the vehicle to the target deceleration even when the ABS control is executed during the brake assist control.

Figure 5:
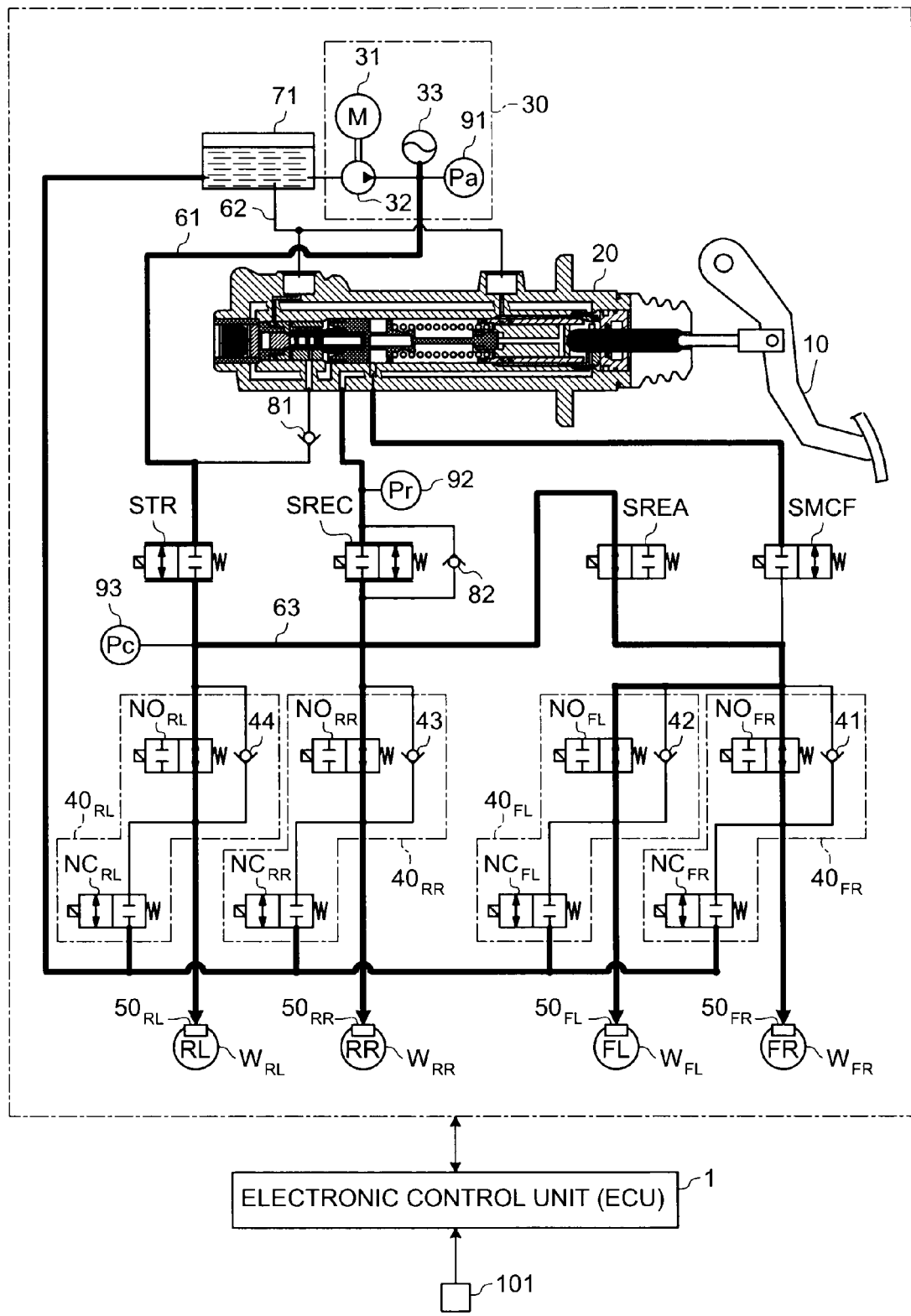
FIG. 5 is a view illustrating an example of the acting state of the brake fluid pressure when the ABS control is executed during the brake assist control of the vehicle braking apparatus according to the present invention and the view illustrating a state of a control valve STR before actual deceleration of a vehicle becomes smaller than target deceleration.
Figure 6:
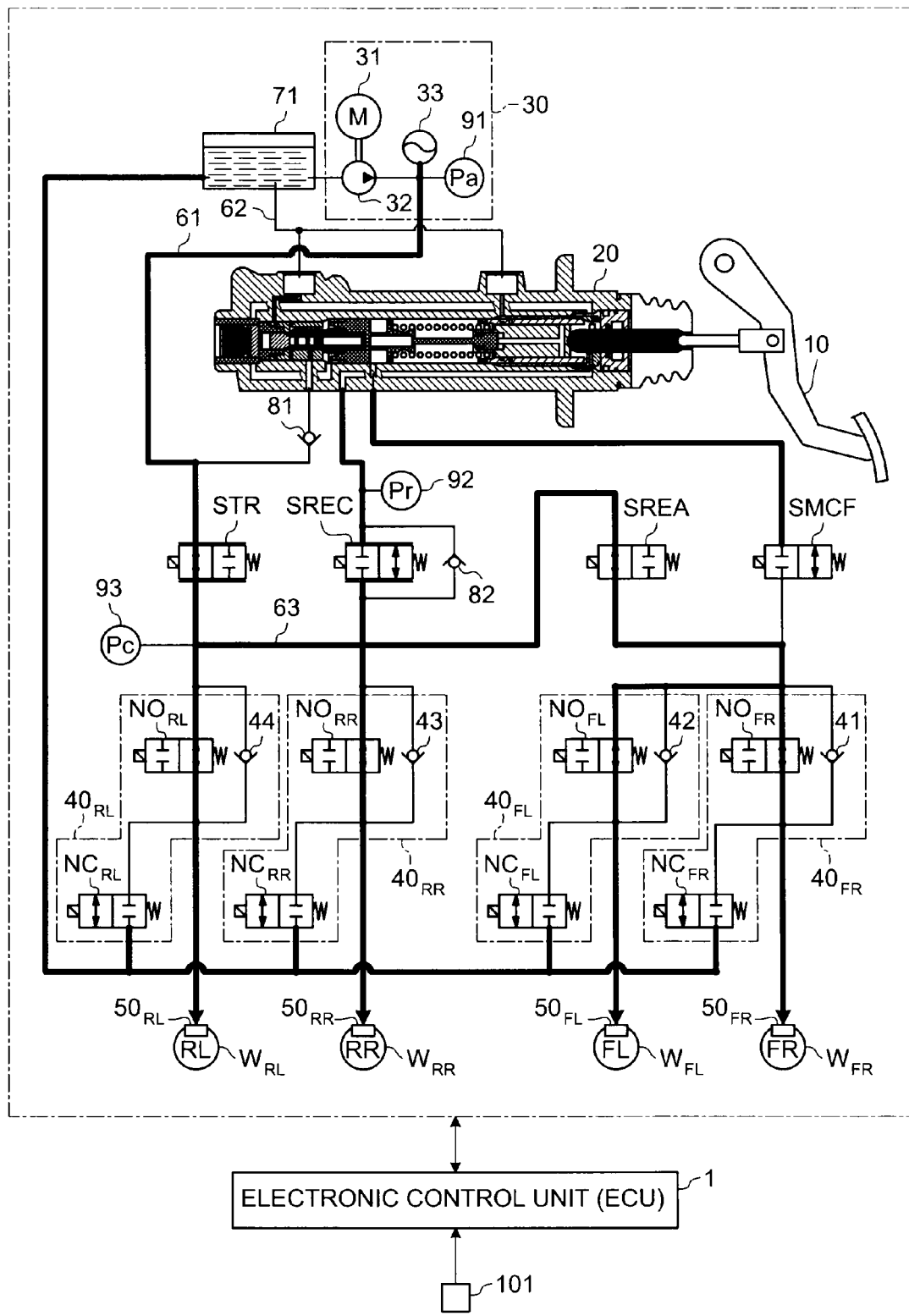
FIG. 6 is a view illustrating an example of the acting state of the brake fluid pressure when the ABS control is executed during the brake assist control of the vehicle braking apparatus according to the present invention and the view illustrating the state of the control valve STR when the actual deceleration of the vehicle becomes smaller than the target deceleration.

Specifically, in the embodiment, the brake fluid pressure controlling means is configured to put the control valve STR in the closed state in FIG. 5 into the excited state to open as illustrated in FIG. 6 when the actual deceleration of the vehicle becomes smaller than the target deceleration when the ABS control is executed during the brake assist control. That is to say, in the embodiment, the accumulator pressure Pa is supplied to the brake fluid piping 63 to increase the pressure by opening the control valve STR in such a case, and the brake fluid pressure appropriate for the ABS control is supplied to the wheel cylinder $50_{FR}$ or $50_{FL}$ or $50_{RR}$, or $50_{RL}$, which is the ABS control target, and on the other hand, the brake fluid pressure appropriate for the brake assist control is supplied to the wheel cylinder $50_{FR}$ or $50_{FL}$ or $50_{RR}$ or $50_{RL}$, which is not the ABS control target.

Herein, the accumulator pressure Pa is adjusted so as to be the additional amount of the brake fluid pressure required for the brake assist control, as described above. Therefore, the brake fluid pressure (brake assist control pressure $Pc_{BA}$) of the appropriate magnitude is supplied to the wheel cylinder $50_{FR}$ or $50_{FL}$ or $50_{RR}$ or $50_{RL}$, which is not the ABS control target, by the accumulator pressure Pa supplied to the brake fluid piping 63. On the other hand, in the wheel cylinder $50_{FR}$ or $50_{FL}$ or $50_{RR}$ or $50_{RL}$, which is the ABS control target, although the brake fluid pressure can be rapidly increased during the ABS pressure increasing control by the accumulator pressure Pa supplied to the brake fluid piping 63, if execution time of the ABS pressure increasing control (hereinafter, referred to as "ABS pressure increasing control time") is not suitable, deficiency or excess occurs in the brake fluid pressure. In the embodiment, since the brake control pressure Pc of the brake fluid piping 63 is of the same magnitude (brake assist control pressure $Pc_{BA}$) as that before the start of the ABS control by the supply of the accumulator pressure Pa, if the ABS pressure increasing control time is the same as that before the supply of the accumulator pressure Pa, excessive brake fluid pressure (brake assist control pressure $Pc_{BA}$ at the maximum) is supplied to the wheel cylinder $50_{FR}$ or $50_{FL}$ or $50_{RR}$ or $50_{RL}$, which is the ABS control target. Therefore, it is possible that the wheel $W_{FR}$ or $W_{FL}$ or $W_{RR}$ or $W_{RL}$, which is the ABS control target, is locked even during the ABS control by the excessive brake fluid pressure. Therefore, in the embodiment, the brake fluid pressure controlling means is configured such that the ABS pressure increasing control time is shorter than that before the supply of the accumulator pressure Pa in order to prevent the wheel $W_{FR}$ or $W_{FL}$ or $W_{RR}$ or $W_{RL}$, which is the ABS control target, from being locked in association with the supply of the accumulator pressure Pa.

Figure 7:
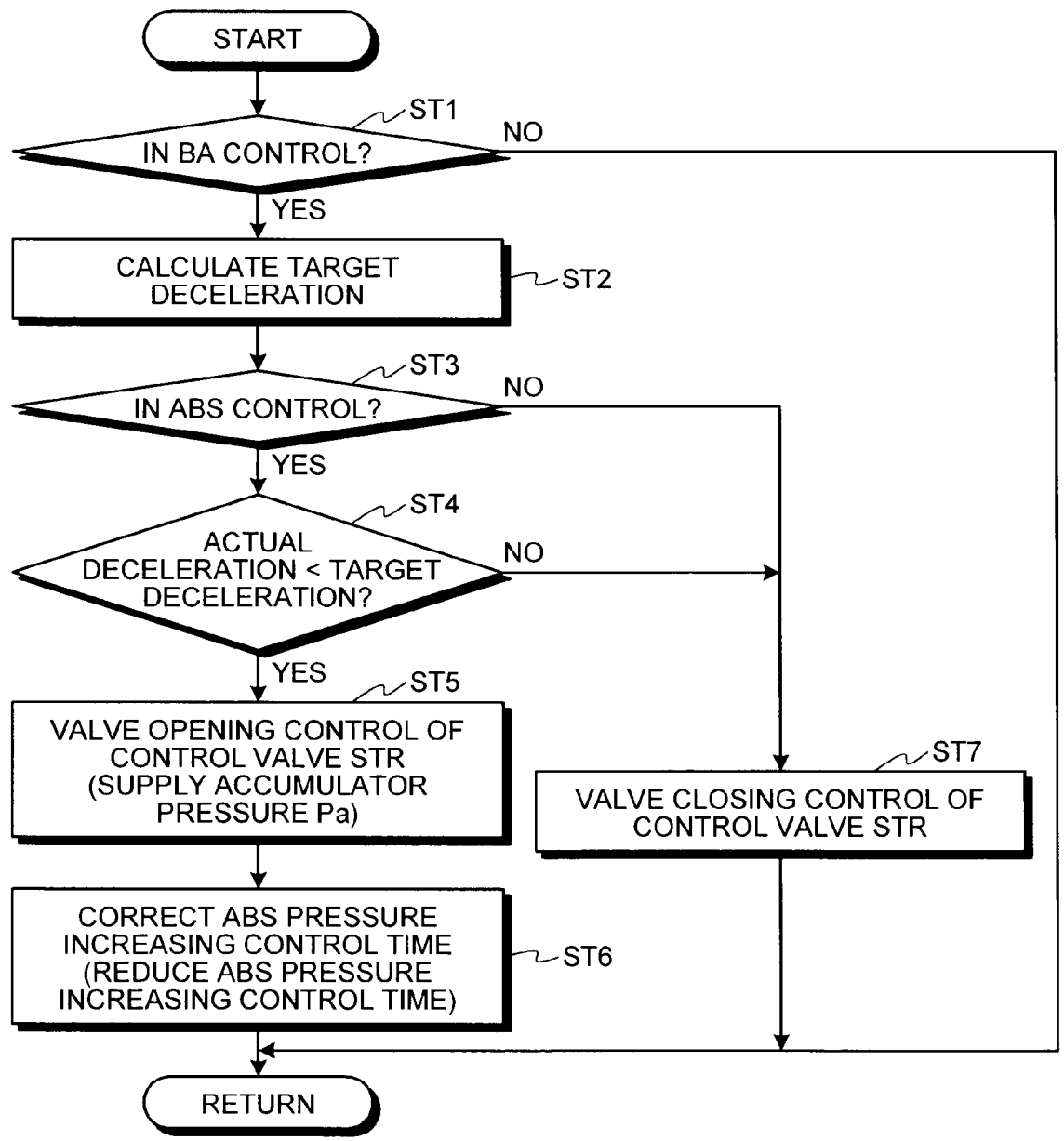
FIG. 7 is a flowchart illustrating operation at the time of the brake assist control of the vehicle braking apparatus according to the present invention.

Hereinafter, operation at the time of the brake assist control of the vehicle braking apparatus of the embodiment is described with reference a flowchart in FIG. 7.

First, the brake fluid pressure controlling means of the embodiment judges whether it is currently in the brake assist control (BA control) based on contents of the control command thereof for the control valves SMCF, SREA, SREC, STR and the like, for example (step ST1).

When the brake fluid pressure controlling means judges that it is not in the brake assist control, this finishes a calculation process once and repeats the judgment at the step ST1.

On the other hand, when it is judged to be in the brake assist control at the above-described step ST1, the brake fluid pressure controlling means calculates the target deceleration of the vehicle at that time (step ST2). For example, at the step ST2, the target deceleration is obtained based on map data and the like in which the operational amount of the brake pedal 10 by the driver or the regulator pressure Pr detected by the regulator pressure detecting sensor 92 (≈master cylinder pressure Pm) and the brake assist control pressure $Pc_{BA}$ as a control target value or the accumulator pressure Pa detected by the accumulator pressure detecting sensor 91 (=additional amount of the brake fluid pressure required for the brake assist control) are used as parameters.

Subsequently, the brake fluid pressure controlling means observes whether the contents of the control command for each of the brake fluid pressure adjusting means $40_{FR}$, $40_{FL}$, $40_{RR}$ and $40_{RL}$ are about the ABS pressure increasing control, the ABS pressure reducing control and the like to judge whether any one of the wheels $W_{FR}$, $W_{FL}$, $W_{RR}$ and $W_{RL}$ is the ABS control target (that is to say, whether it is in the ABS control) (step ST3).

When it is judged to be in the ABS control at the step ST3, the brake fluid pressure controlling means compares the actual deceleration of the vehicle obtained based on a detected value (vehicle front-rear acceleration) of a vehicle front-rear acceleration sensor 101 illustrated in FIG. 1, for example, and the target deceleration at the above-described step ST2 to judge whether the actual deceleration becomes smaller than the target deceleration (step ST4).

When it is judged that the actual deceleration is smaller than the target deceleration at the step ST4, the brake fluid pressure controlling means puts the control valve STR in the nonexcited state (closed state) into the excited state to open the same (step ST5).

In association with the valve opening, the accumulator pressure Pa of the high pressure generating means 30 is supplied to the brake fluid piping 63, so that the brake fluid pressure of the wheel cylinder $50_{FR}$ or $50_{FL}$ or $50_{RR}$ or $50_{RL}$ of the wheel $W_{FR}$ or $W_{FL}$ or $W_{RR}$ or $W_{RL}$, which is not the ABS control target, is increased to that of the appropriate magnitude (brake assist control pressure $Pc_{BA}$) at the same time as the opening of the control valve STR.

On the other hand, when the brake fluid pressure adjusting means $40_{FR}$ or $40_{FL}$ or $40_{RR}$ or $40_{RL}$ of the wheel $W_{FR}$ or $W_{FL}$ or $W_{RR}$ or $W_{RL}$, which is the ABS control target, is put into the ABS pressure increasing control state after the opening of the control valve STR, the brake fluid pressure of the wheel cylinder $50_{FR}$ or $50_{FL}$ or $50_{RR}$ or $50_{RL}$ of the wheel $W_{FR}$ or $W_{FL}$ or $W_{RR}$ or $W_{RL}$, which is the ABS control target, can be rapidly increased by the high accumulator pressure Pa supplied to the brake fluid piping 63. Therefore, the appropriate ABS control can be executed to the wheel $W_{FR}$ or $W_{FL}$ or $W_{RR}$ or $W_{RL}$, which is the ABS control target.

Herein, when the ABS pressure increasing control is performed to the wheel cylinder $50_{FR}$ or $50_{FL}$ or $50_{RR}$ or $50_{RL}$, which is the ABS control target, by the brake fluid pressure adjusting means $40_{FR}$ or $40_{FL}$ or $40_{RR}$ or $40_{RL}$, which is the ABS control target, with the ABS pressure increasing control time (anti-lock brake pressure increasing control time) as long as that so far while supplying the brake fluid pressure in the brake fluid piping 63, which is the accumulator pressure Pa at the maximum, the excessive brake fluid pressure is supplied to the wheel cylinder $50_{FR}$ or $50_{FL}$ or $50_{RR}$ or $50_{RL}$, as described above. Therefore, the brake fluid pressure controlling means sets the ABS pressure increasing control time, which prevents the wheel $W_{FR}$ or $W_{FL}$ or $W_{RR}$ or $W_{RL}$, which is the ABS control target, from being locked by the excessive brake fluid pressure according to the accumulator pressure Pa, the slip ratio and the like of the wheel $W_{FR}$ or $W_{FL}$ or $W_{RR}$ or $W_{RL}$, which is the ABS control target. That is to say, the brake fluid pressure controlling means corrects the ABS pressure increasing control time to be shorter than that before the control valve STR is opened at the above-described step ST5 (step ST6). According to this, in the wheel $W_{FR}$ or $W_{FL}$ or $W_{RR}$ or $W_{RL}$, which is the ABS control targets, the supply of the excessive brake fluid pressure can be prevented while the deficiency of the brake fluid pressure for the wheel cylinder $50_{FR}$ or $50_{FL}$ or $50_{RR}$ or $50_{RL}$ thereof is immediately compensated.

Herein, when it is judged not to be in the ABS control at the above-described step ST3, the brake fluid pressure controlling means performs closing control of the control valve STR (step ST7). At the step ST7, when the control valve STR is already closed, this is kept in the closed state (nonexcited state). On the other hand, when the control valve STR is kept opening just after the start of the brake assist control, for example, the opened state (excited state) is switched to the closed state (nonexcited state) and the execution of the brake assist control is continued. Also, when the control valve STR is opened through the above-described step ST5, for example, the opened state (excited state) is switched to the closed state (nonexcited state) and it returns to the brake assist control alone.

Also, when it is judged that the actual deceleration is not smaller than the target deceleration at the above-described step ST4, the brake fluid pressure controlling means shifts to the above-described step ST7 to perform the closing control of the control valve STR. At the step ST7 at that time, combination of the brake assist control and the ABS control is continued regardless of whether the control valve STR is closed or opened.

The brake fluid pressure controlling means of the embodiment repeats the above-described calculation process as long as it is in the brake assist control. According to this, when the ABS control is executed during the brake assist control, the vehicle braking apparatus of the embodiment can supply the brake fluid pressure according to the ABS control to the wheel cylinders $50_{FR}$, $50_{FL}$, $50_{RR}$ and $50_{RL}$ of the wheels $W_{FR}$, $W_{FL}$, $W_{RR}$ and $W_{RL}$, in the ABS control, respectively, without deficiency or excess and with high responsibility. Also, this can continue supplying the appropriate brake fluid pressure according to the brake assist control to the wheel cylinders $50_{FR}$, $50_{FL}$, $50_{RR}$ and $50_{RL}$ of the wheels $W_{FR}$, $W_{FL}$, $W_{RR}$ and $W_{RL}$, respectively, which are not in the ABS control. Therefore, the vehicle braking apparatus of the embodiment can prevent the actual deceleration of the vehicle from being lower than the target deceleration even when the ABS control is executed during the brake assist control and can control the actual deceleration to the target deceleration, thereby appropriately decelerating the vehicle.

The ABS control is principally executed at the time of moving to a road surface of which friction coefficient is low (low μ road). In this case, in general, the front wheels $W_{FR}$ and $W_{FL}$ first move to the low μ road and thereafter the rear wheels $W_{RR}$ and $W_{RL}$ move to the low μ road. Therefore, at the start of the ABS control, there is a situation in which the rear wheels $W_{RR}$ and $W_{RL}$ are not in the ABS control state even when the front wheels $W_{FR}$ and $W_{FL}$ are in the ABS control. Herein, from a viewpoint of stabilization of behavior of the vehicle, for example, rapid change in braking force and driving force of the rear wheels $W_{RR}$ and $W_{RL}$ are not preferable. However, when only the front wheels $W_{FR}$ and $W_{FL}$ are in the ABS control during the brake assist control, the pressure increasing valves $NO_{RR}$ and $NO_{RL}$ of the rear wheels $W_{RR}$ and $W_{RL}$, respectively, are opened, so that it is possible that the braking force of the rear wheels $W_{RR}$ and $W_{RL}$ before the start of the ABS control rapidly increases by the supply of the above-described accumulator pressure Pa to the brake fluid piping 63. For example, when the brake control pressure Pc of the brake fluid piping 63 becomes significantly lower than the brake assist control pressure $Pc_{BA}$ and then the actual deceleration of the vehicle becomes lower than the target deceleration, the brake control pressure Pc of the brake fluid piping 63 significantly and rapidly increases up to the brake assist control pressure $Pc_{BA}$ by the supply of the accumulator pressure Pa, so that the braking force of the rear wheels $W_{RR}$ and $W_{RL}$ before the start of the ABS control rapidly increase. Meanwhile, as for the pressure increasing valves $NO_{FR}$ and $NO_{FL}$ of the front wheels $W_{FR}$ and $W_{FL}$ during the ABS control, respectively, are basically closed and are opened when executing the ABS pressure increasing control, so that the possibility that the braking force of the front wheels $W_{FR}$ and $W_{FL}$ rapidly increases is low.

Then, the vehicle braking apparatus of the embodiment is configured to gradually increase the brake fluid pressure of the wheel cylinders $50_{RR}$ and $50_{RL}$ of the rear wheels $W_{RR}$ and $W_{RL}$ before the start of the ABS control, respectively, in such a case so as not to rapidly change the braking force of the rear wheels $W_{RR}$ and $W_{RL}$. Specifically, the brake fluid pressure controlling means is configured such that the brake fluid pressure of the wheel cylinders $50_{RR}$ and $50_{RL}$ gradually increases by repeatedly opening and closing the pressure increasing valves $NO_{RR}$ and $NO_{RL}$ of the rear wheels $W_{RR}$ and $W_{RL}$, respectively, which are opened in the brake assist control, if the ABS control of the rear wheels $W_{RR}$ and $W_{RL}$ is not started yet.

Hereinafter, operation at the time of the brake assist control of the vehicle braking apparatus in this case is described with reference to a flowchart in FIG. 8.

First, the brake fluid pressure controlling means judges whether it is in the brake assist control (BA control) as at the above-described step ST1 (step ST11), and when it is in the brake assist control, this calculates the target deceleration of the vehicle as at the above-described step ST2 (step ST12). Meanwhile, when it is judged not to be in the brake assist control at the step ST11, this finishes the calculation process once and repeats the judgment at the step ST11 again.

Subsequently, the brake fluid pressure controlling means observes whether the contents of the control command for the brake fluid pressure adjusting means $40_{FR}$ and $40_{FL}$ of the front wheels $W_{FR}$ and $W_{FL}$, respectively, are about the ABS pressure increasing control, the ABS pressure reducing control and the like, for example, and judges whether both of the front wheels $W_{FR}$ and $W_{FL}$ are in the ABS control (step ST13).

When it is judged that both of the front wheels $W_{FR}$ and $W_{FL}$ are in the ABS control at the step ST13, the brake fluid pressure controlling means compares the actual deceleration of the vehicle and the target deceleration at the above-described step ST12 to judges whether the actual deceleration is smaller than the target deceleration as at the above-described step ST4 (step ST14).

When it is judged that the actual deceleration is smaller than the target deceleration at the step ST14, the brake fluid pressure controlling means puts the control valve STR in the nonexcited state (closed state) into the excited state to open the same (step ST15). Then, the brake fluid pressure controlling means corrects the ABS pressure increasing control time so as to be shorter than that before the control valve STR is opened at the above-described step ST15 as at the above-described step ST6 (step ST16).

According to this, in the front wheels $W_{FR}$ and $W_{FL}$, which are the ABS control targets, the deficiency of the brake fluid pressure for the wheel cylinders $50_{FR}$ and $50_{FL}$ of the front wheels $W_{FR}$ and $W_{FL}$, respectively, is immediately compensated by the brake control pressure Pc of the brake fluid piping 63 increased by the supply of the accumulator pressure Pa in association with the opening of the control valve STR, as in the above-described illustration, and the appropriate ABS control is executed. Also, at that time, the ABS pressure increasing control time is made appropriate, so that the supply of the excessive brake fluid pressure to the wheel cylinders $50_{FR}$ and $50_{FL}$ can be prevented.

Further, the brake fluid pressure controlling means observes whether the contents of the control command for the brake fluid pressure adjusting means $40_{RR}$ and $40_{RL}$ of the rear wheels $W_{RR}$ and $W_{RL}$, respectively, are about the ABS pressure increasing control, the ABS pressure reducing control and the like to judge whether the ABS control of the rear wheels $W_{RR}$ and $W_{RL}$ is started (that is to say, whether they are in an ABS non-control state) (step ST18).

When it is judged that the ABS control of the rear wheels $W_{RR}$ and $W_{RL}$ is not started yet (that is to say, in the ABS non-control state) at the step ST18, the brake fluid pressure controlling means gradually increases the brake fluid pressure of the wheel cylinders $50_{RR}$ and $50_{RL}$ of the rear wheels $W_{RR}$ and $W_{RL}$, respectively (step ST19). At the step ST19, the pressure increasing valves $NO_{RR}$ and $NO_{RL}$ of the rear wheel $W_{RR}$ and $W_{RL}$, respectively, which are opened, are closed and opened again, and the opening and closing are repeated, for example.

According to this, in the rear wheels $W_{RR}$ and $W_{RL}$ before the start of the ABS control, the brake fluid pressure of the wheel cylinders $50_{RR}$ and $50_{RL}$ is gradually increased up to the brake assist control pressure $Pc_{BA}$. Therefore, in the rear wheels $W_{RR}$ and $W_{RL}$, rapid increase in the braking force when the high accumulator pressure Pa is supplied in association with the opening of the control valve STR can be prevented. Therefore, herein, the behavior of the vehicle at that time can be kept in a stable state.

Herein, when it is judged that both of the front wheels $W_{FR}$ and $W_{FL}$ are not in the ABS control at the above-described step ST13, and also when it is judged that the actual deceleration is not smaller than the target deceleration at the above-described step ST14, the brake fluid pressure controlling means performs the closing control of the control valve STR according to each case as at the above-described step ST7 (step ST17).

Also, when it is judged that the rear wheels $W_{RR}$ and $W_{RL}$ are in the ABS control at the above-described step ST18, the brake fluid pressure controlling means finishes the calculation process once and returns to the above-described step ST11.

As described above, the vehicle braking apparatus of the embodiment can control the actual deceleration of the vehicle to the target deceleration while keeping the behavior of the vehicle stable by gradually increasing the brake fluid pressure supplied to the rear wheels $W_{RR}$ and $W_{RL}$ before the start of the ABS control, when the ABS control is executed during the brake assist control and the actual deceleration of the vehicle is likely to be lower than the target deceleration.

Herein, in the viewpoint of the stabilization of the behavior of the vehicle, it is desirable the most to gradually increase the brake fluid pressure of the rear wheels $W_{RR}$ and $W_{RL}$ before the start of the ABS control or which are not the ABS control targets. However, even when the targets of the increase of the brake fluid pressure are the front wheels $W_{FR}$ and $W_{FL}$, which are not in the ABS control, they dedicate to the stabilization of the behavior of the vehicle. Therefore, it is preferable that the vehicle braking apparatus of the embodiment is configured to gradually increase the brake fluid pressure supplied to the wheel $W_{FR}$ or $W_{FL}$ or $W_{RR}$ or $W_{RL}$, which is not the ABS control target, without regard to the front wheels $W_{FR}$ and $W_{FL}$ and the rear wheels $W_{RR}$ and $W_{RL}$ when the ABS control is executed during the brake assist control and the actual deceleration of the vehicle is likely to be lower than the target deceleration.

INDUSTRIAL APPLICABILITY

As described above, the vehicle braking apparatus according to the preset invention is applicable to technology to control the actual deceleration of the vehicle to the target deceleration when the ABS control is executed during the brake assist control.

The invention claimed is:

1. A vehicle braking apparatus, comprising:
a brake fluid pressure generating unit that generates a brake fluid pressure according to brake pedal operation by a driver;
a high pressure generating unit that generates brake fluid pressure higher than the brake fluid pressure of the brake fluid pressure generating unit;
a brake fluid pressure adjusting unit that adjusts brake fluid pressure to be supplied to a wheel cylinder of a wheel;
a brake fluid pressure control valve that allows the brake fluid pressure generating unit and the brake fluid pressure adjusting unit to communicate with each other when being opened, and blocks communication when being closed;
a high pressure control valve that allows the high pressure generating unit and the brake fluid pressure adjusting unit to communicate with each other when being opened, and blocks communication when being closed; and
a brake fluid pressure controlling unit that is configured to close the brake fluid pressure control valve at a time of brake assist control and open the high pressure control valve until a downstream side of the high pressure control valve reaches a predetermined brake assist control pressure, and to control the brake fluid pressure adjusting unit of a wheel being an anti-lock brake control target at a time of anti-lock brake control to increase, reduce or hold the brake fluid pressure of the wheel cylinder of the wheel being the anti-lock brake control target, wherein
the brake fluid pressure controlling unit controls the high pressure control valve based on a brake assist control pressure at the downstream side of the high pressure control valve and an upstream side of the brake fluid pressure adjusting unit at the time of the brake assist control, controls to open the high pressure control valve without depending on the brake assist control pressure to increase the brake fluid pressure of the wheel cylinder of the wheel being the anti-lock brake control target when actual deceleration of a vehicle becomes lower than target deceleration by execution of the anti-lock brake control during the brake assist control, and makes an anti-lock brake pressure increasing control time of the brake fluid pressure adjusting unit in the wheel being the anti-lock brake control target shorter than an anti-lock brake pressure increasing control time before the high pressure control valve is opened when performing opening control of the high pressure control valve when executing the anti-lock brake control during the brake assist control.

2. The vehicle braking apparatus according to claim 1, wherein
the brake fluid pressure controlling unit is configured to gradually increase the brake fluid pressure to be supplied to a wheel cylinder of a wheel that is not the anti-lock brake control target by controlling the brake fluid pressure adjusting unit, when performing opening control of the high pressure control valve when executing the anti-lock brake control during the brake assist control.

3. The vehicle braking apparatus according to claim 1, wherein
the brake assist control pressure is detected by a brake control pressure detecting sensor that is arranged in a brake fluid piping that connects a downstream part of the high pressure control valve and an upstream part of the brake fluid pressure adjusting unit.

4. A vehicle braking apparatus, comprising:
a brake fluid pressure generating unit that generates a brake fluid pressure according to brake pedal operation by a driver;
a high pressure generating unit that generates brake fluid pressure higher than the brake fluid pressure of the brake fluid pressure generating unit;
a brake fluid pressure adjusting unit that adjusts brake fluid pressure to be supplied to a wheel cylinder of a wheel;
a brake fluid pressure control valve that allows the brake fluid pressure generating unit and the brake fluid pressure adjusting unit to communicate with each other when being opened, and blocks communication when being closed;
a high pressure control valve that allows the high pressure generating unit and the brake fluid pressure adjusting unit to communicate with each other when being opened, and blocks communication when being closed; and
a brake fluid pressure controlling unit that is configured to close the brake fluid pressure control valve at a time of brake assist control and open the high pressure control valve until a downstream side of the high pressure control valve reaches a predetermined brake assist control pressure, and to control the brake fluid pressure adjusting unit of a wheel being an anti-lock brake control target at a time of anti-lock brake control to increase, reduce or hold the brake fluid pressure of the wheel cylinder of the wheel being the anti-lock brake control target, wherein the brake fluid pressure controlling unit controls to open the high pressure control valve to increase the brake fluid pressure of the wheel cylinder of the wheel being the anti-lock brake control target when actual deceleration of a vehicle becomes lower than target deceleration by execution of the anti-lock brake control during the brake assist control, and makes an anti-lock brake pressure increasing control time of the brake fluid pressure adjusting unit in the wheel being the anti-lock brake control target shorter than an anti-lock brake pressure increasing control time before the high pressure control valve is opened when performing opening control of the high pressure control valve when executing the anti-lock brake control during the brake assist control.

5. The vehicle braking apparatus according to claim 4, wherein the brake fluid pressure controlling unit is configured to gradually increase the brake fluid pressure to be supplied to a wheel cylinder of a wheel that is not the anti-lock brake control target by controlling the brake fluid pressure adjusting unit, when performing opening control of the high pressure control valve when executing the anti-lock brake control during the brake assist control.

6. The vehicle braking apparatus according to claim 4, wherein the brake assist control pressure is detected by a brake control pressure detecting sensor that is arranged in a brake fluid piping that connects a downstream part of the high pressure control valve and an upstream part of the brake fluid pressure adjusting unit.

* * * * *